United States Patent [19]

Bunger

[11] 3,955,536
[45] May 11, 1976

[54] APPARATUS FOR CONVERTING THE RESIDUAL NUTRITIVE CONTENT OF ANIMAL WASTE INTO NUTRITIOUS AND PALATABLE FEED SUPPLEMENT FOR REFEEDING TO LIVESTOCK

[76] Inventor: Richard E. Bunger, 5202 E. Washington St., Phoenix, Ariz. 85034

[22] Filed: Mar. 10, 1975

[21] Appl. No.: 557,051

Related U.S. Application Data

[62] Division of Ser. No. 406,347, Oct. 15, 1973, abandoned.

[52] U.S. Cl. ............................... 119/28; 119/51 R
[51] Int. Cl.² ........................................... A01K 1/00
[58] Field of Search ................. 119/28, 15, 16, 22, 119/51 R; 210/15

[56] References Cited

UNITED STATES PATENTS

| 2,591,643 | 4/1952 | Volmer | 119/28 |
| 3,021,819 | 2/1962 | Krahn | 119/28 X |
| 3,462,275 | 8/1969 | Bellamy | 210/15 |
| 3,550,524 | 12/1970 | Brumagim | 119/28 UX |

*Primary Examiner*—Hugh R. Chamblee
*Attorney, Agent, or Firm*—Warren F. B. Lindsley

[57] ABSTRACT

A process for converting the residual nutritive content of animal waste into nutritious and palatable feed supplement for refeeding to livestock comprising collecting and diluting the manure, agitating the diluted manure, separating the fibrous and liquid parts from each other, drying and pasteurizing the fibrous part in a given manner, and recovering the nutrients from the liquid part.

5 Claims, 4 Drawing Figures

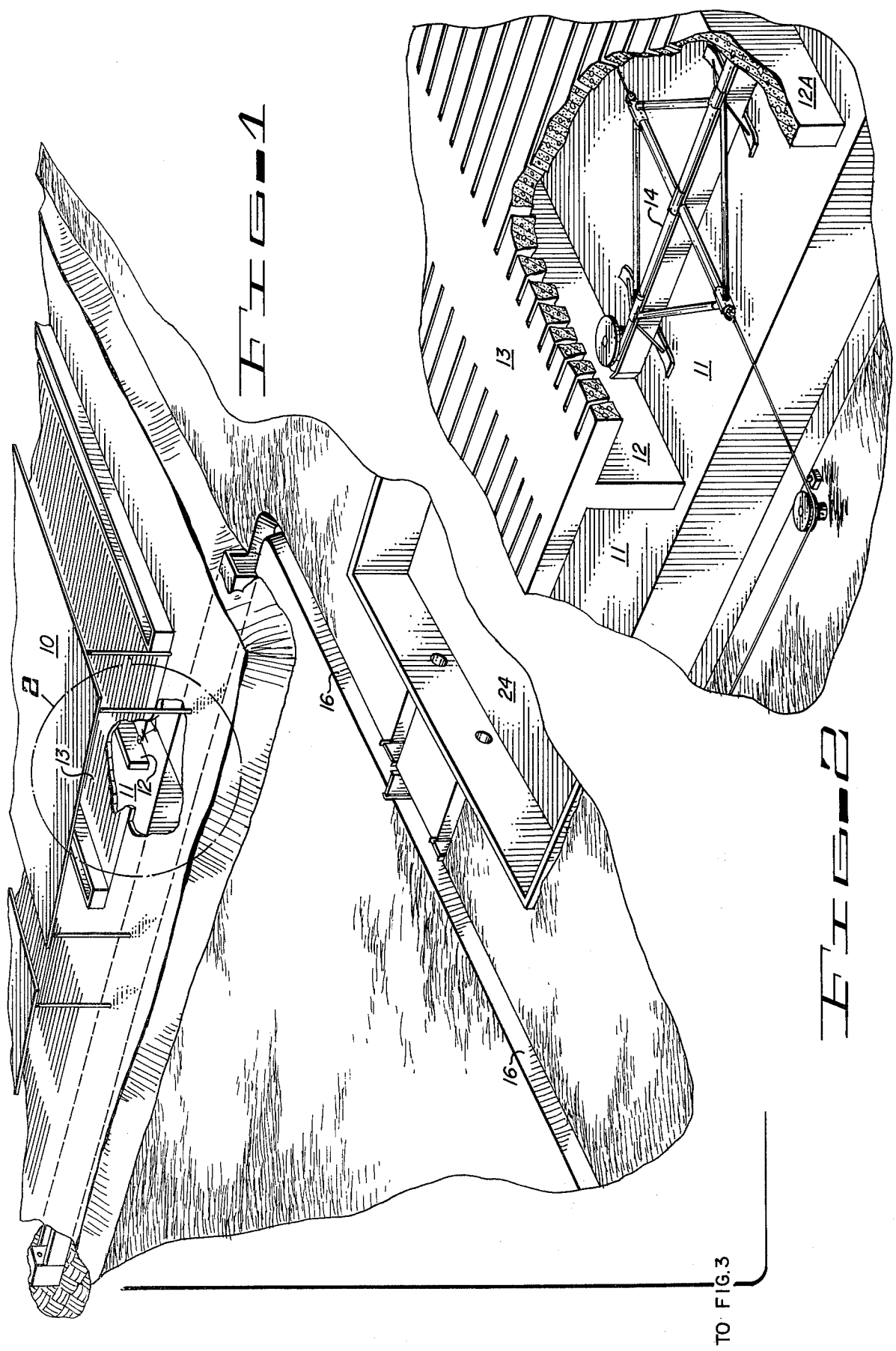
U.S. Patent  May 11, 1976  Sheet 1 of 3  3,955,536

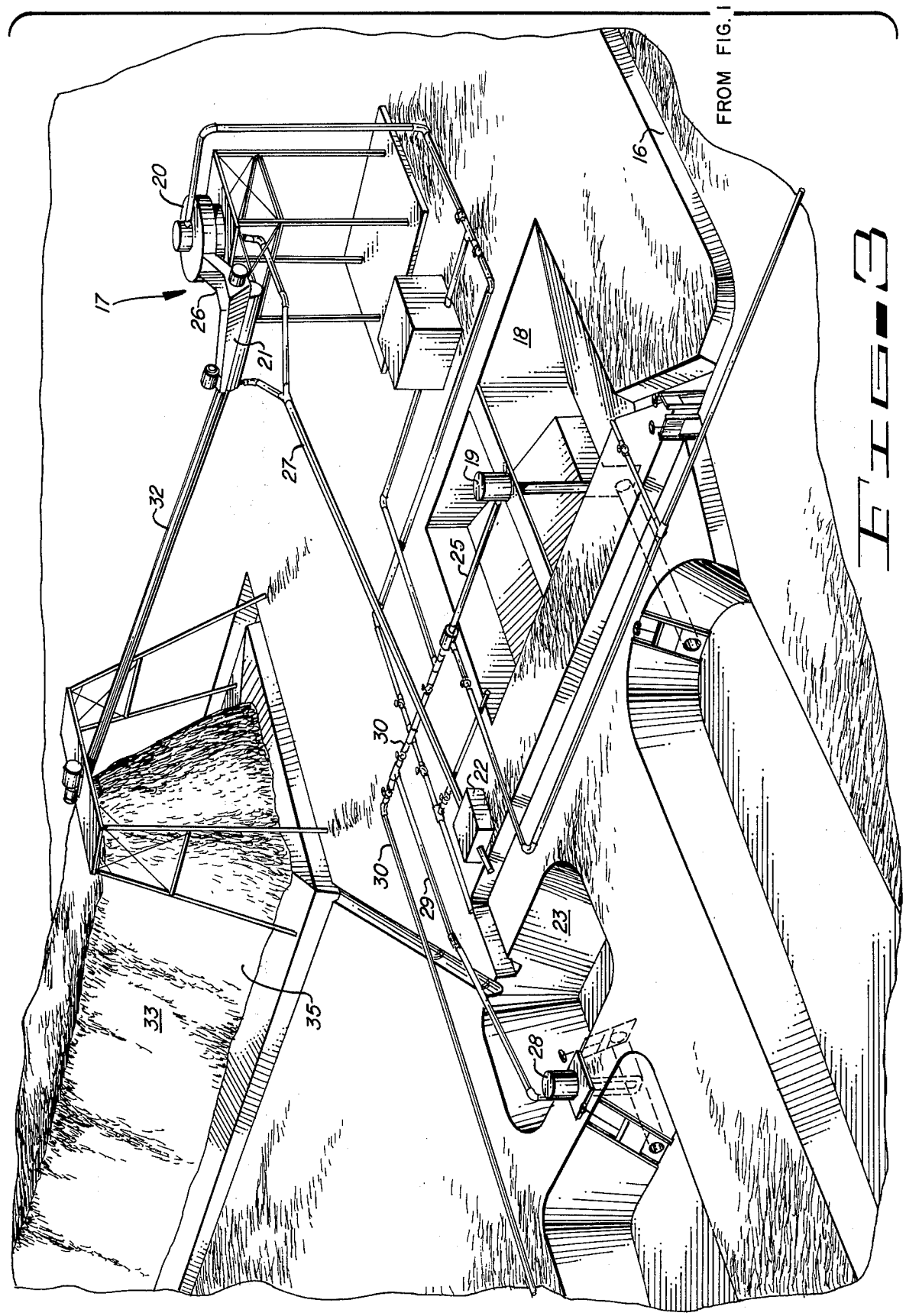

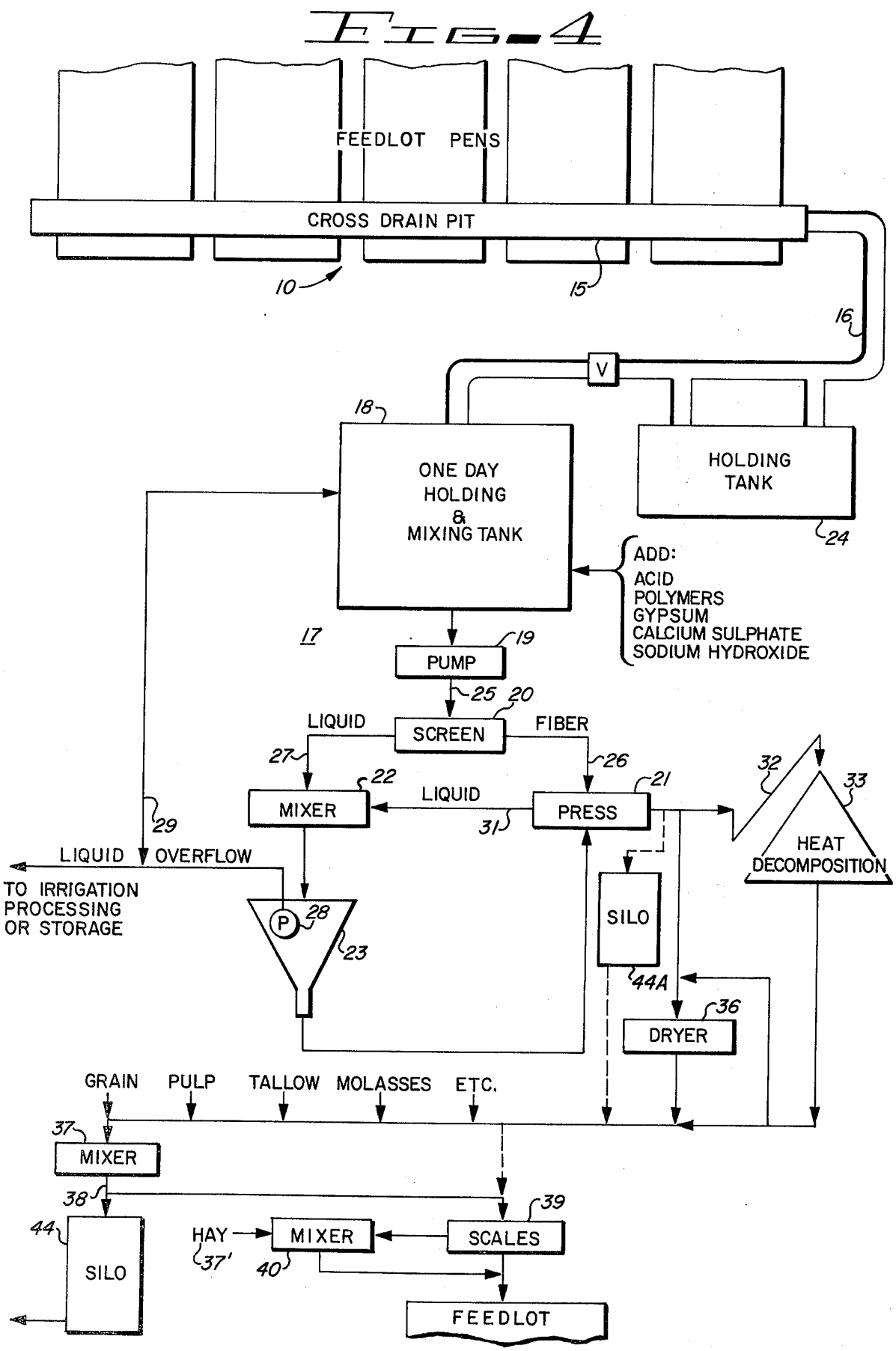

APPARATUS FOR CONVERTING THE RESIDUAL NUTRITIVE CONTENT OF ANIMAL WASTE INTO NUTRITIOUS AND PALATABLE FEED SUPPLEMENT FOR REFEEDING TO LIVESTOCK

This application is a division of U.S. Pat. application Ser. No. 406,347 filed Oct. 15, 1973, now abandoned entitled A PROCESS FOR CONVERTING THE RESIDUAL NUTRITIVE CONTENT OF ANIMAL WASTE INTO NUTRITIOUS AND PALATABLE FEED SUPPLEMENT FOR REFEEDING TO LIVESTOCK.

BACKGROUND OF THE INVENTION

The use of commercial feedlots for the fattening of cattle was introduced only a few years ago, but because of the relative profitability of this approach, it has rapidly grown in popularity and now completely dominates the cattle-fattening industry. Large numbers of cattle running to the thousands and tens of thousands are brought to these lots where they are concentrated in relatively close quarters.

The problems associated with these feedlots have grown at the same rate, however, and now represent a major national concern. The odors produced by the lots have created serious problems, especially when the feedlots have been located near population centers. Waste materials carried into the soil by rainwater runoff threaten pollution of ground water and pose a serious health hazard to the surrounding communities. The accumulation of manure at the feelots is also a hazard to the health of the cattle themselves because of the contamination of the air and because it attracts flies and other insects.

DESCRIPTION OF THE PRIOR ART

Various scientific methods for the treatment of animal wastes are known. A bulletin published by the University of Illinois in cooperation with Purdue University (Bulletin 737, "Aerobic Treatment of Livestock Wastes" by D. L. Day and A. C. Dale, May, 1970) differentiates between aerobic and anaerobic processes in which certain types of bacteria are employed to break down animal wastes: "Aerobic bacteria (aerobes) require dissolved oxygen for metabolism, using oxygen as a hydrogen acceptor. Anaerobic bacteria use other hydrogen acceptors, such as sulfate and carbon dioxide. Another group of microorganisms is faculative and gains energy by either the aerobic or anaerobic pathway." The aerobic process has the advantage that it is odorless, while the anaerobic process allows the treatment of a higher volume of material in a given processing area. The bulletin describes the use of the oxidation ditch as a practical approach for aerobic treatment of wastes.

The health and environmental problems described provide a strong incentive for the development of improved waste handling means for feedlots in which these scientific methods may be applied in a practical and economical way; more recent scientific developments have uncovered what may be an even stronger incentive for the development of improved waste-handling systems. It has been known for some time that beef cattle make relatively inefficient use of the food value present in their rations. Of the total protein content initially present in the feed, only a small part is removed by the digestive process. The remainder is cast off and is still present in the manure. New processes are now being investigated for converting the manure into high quality cattle feed, thereby recovering the unused protein content and turning the waste problem into a potentially profitable opportunity.

The Whittingham U.S. Pat. No. 3,718,504 discloses a process for recovering starches, sugars and other minerals from manure. A recent article (April, 1973) in CALF NEWS reports on a development by Hamilton Standard utilizing a thermophilic anaerobic fermentation process which permits very rapid processing of highly concentrated waste materials. Still another article in CALF NEWS (May, 1973) reports that the General Electric Company has isolated strains of thermophilic or "heat loving" bacteria which feed on cellulose and lignin in waste materials. These bacteria are active at elevated temperatures of 130 to 180° Fahrenheit, at which other bacteria and viruses are destroyed. This process will be applied, according to the article, in the recycling of cattle manure and indicates that the waste from one steer can theoretically by converted to fulfill the protein requirements of one and one-half steers.

Such new developments open up new opportunities and demands for advanced equipment and feedlot arrangements for the effective implementation of the new processes. The urgency and the importance of such new equipment and arrangements matches the significance of the national problems of pollution and food production for which they offer solutions.

SUMMARY OF THE INVENTION

In accordance with the invention claimed, it is one object of this invention to provide an improved waste processing system.

Another object of this invention is to provide a new and improved waste processing system for use in conjunction with livestock feedlots.

A further object of this invention is to provide a waste processing system that is substantially odor-free.

A still further object of this invention is to provide a waste processing system that does not pollute ground water, has a minimum attraction for flies and insects, and does not constitute a health hazard to the surrounding community or to the animals it serves.

A still further object of this invention is to provide a waste processing system that takes full advantage of the residual nutritive content of the animal wastes by converting or reclaiming it into a nutritious and palatable feed supplement for refeeding to cattle or other livestock.

A still further object of this invention is to provide a waste processing system employing controlled temperatures in its processes to insure a resultant, safe and palatable feed material.

A still further object of this invention is to provide an improved waste processing system that combines the treatment process with its cleaning and transporting operations to provide an odor-free system while at the same time realizing a reduction in biochemical oxygen demand.

Yet another object of this invention is to provide an improved waste processing system which is fully automatic and requires a minimum of supervision and maintenance.

Other objects and advantages of the invention will become apparent from the following description when taken in connection with the accompanying drawings.

BRIEF DESCRIPTION OF THE DRAWINGS

The present invention may be more readily described by reference to the accompanying drawings, in which:

FIG. 1 is a partial diagrammatic view of a feedlot for animals and an animal waste removal system therefor.

FIG. 2 is an enlarged view of one part of the structure shown in FIG. 1 illustrating a scraping system for waste removal from the feedlot.

FIG. 3 is a pictorial illustration of an embodiment of part of the waste processing system disclosed.

FIG. 4 is a diagrammatic illustration of one embodiment of the complete waste processing system.

DESCRIPTION OF THE PREFERRED EMBODIMENT

Referring more particularly to the drawings by characters of reference, FIG. 1 discloses diagrammatically a slotted floor enclosure 10 for food animals, such as, for example, cattle. The enclosure is formed over trenches 11 which are lined by pairs of spaced-apart, vertically arranged walls 12 and 12A, more clearly shown in FIG. 2, which support floor panels 13 in a grate or slot-like configuration on their upper surfaces.

The walls are parallelly arranged so that a suitable drag-type waste scraping means 14 may be operably positioned therebetween to move longitudinally thereof to periodically remove the waste from the trenches. The animals penned upon the slotted floors of the feedlot continuously move their feet over the top surfaces of the floors of the pen, and by their action scrape their waste into the pits below the floor. Although enclosure 10 is shown as having floor panels 13 providing a plurality of slats extending laterally of the longitudinal axis of the enclosure, the floor of the enclosure may have one or more slats running longitudinally of the enclosure in lieu thereof.

Since the waste is periodically scraped from the pits such as, for example, three times a day, the animal waste remains moist when it is scraped into the cross drain pit 15. This drain is preferably below the level of the trench so that the scrapings from the scraping means 14 may be easily moved into the pit. By periodically obtaining the fresh animal waste within a few hours after it is expelled from the livestock, the animal waste not only remains moist but also still retains a maximum amount of its valuable organic and inorganic nutrients such as protein, starches, sugars, fats, carbohydrates, phosphates, sulphur, potassium, etc. It is well known that biological degredation of the organic nutrients proceeds at a rapid rate, destroying useful and available nutrient values. Therefore, this invention enables high nutrient recovery because of the rapid processing of waste in hours rather than months as in conventional practice.

The cleaning efficiency and the odor control effectiveness of the cleaning system disclosed may be enhanced in this application through the utilization of an aerated flushing action. Although this function may dissipate some of the valuable nutrients, it may be useful in some instances. The drain pit 15 may be considered a special adaptation of an oxidation ditch. Animal wastes are deposited in the canal or pit by the cleaning mechanisms comprising scraping means 14 aided by a water flushing action. The solids of the waste carried by the water are held in suspension by the sustained velocity of the water and odor is controlled by aeration of the water which promotes the aerobic decomposition and reduction of biochemical oxygen demand, particularly of the liquid portion of the waste materials, as they are circulated within the canal or drain pit 15 prior to delivery as effluent via an exit canal branch 16 to a waste separator system 17.

The water added for the flushing action may be additional liquid to the system or it may be recycled effluent from a closed system as hereinafter explained. This additional liquid in the presence of vigorous agitation causes the microsize particles which are connected to the fibers in the animal waste to loosen, allowing them to pass through a screen in separator subsystem 17.

Separator subsystem 17, as shown in FIGS. 3 and 4, comprises a one-day holding and mixing tank 18 having a pump 19, vibrating screening apparatus 20, press 21, mixer and a settling tank 23. If it is desirable to shut the waste handling system down, the scraping and waste removal may continue with the waste being stored in a holding tank 24 shown in FIGS. 1 and 4.

The effluent delivered to tank 18 and pump 19 via canal branch 16 may be combined in tank 18 with a number of chemical additives including acids for control of pH factor and improved lignin decomposition, gypsum, polymer and calcium sulphate to aid floculation, and sodium hydroxide to increase cell wall digestibility in proportions appropriate to the characteristics of the effluent.

The resulting mixture emanating from tank 18 and pump 19 is transmitted through pipe 25 and is deposited on vibrating screening apparatus 20 which separates fibrous matter from liquids, the fibers being delivered through conduit 26 to press 21 and the liquids being delivered through conduit 27 to mixer 22 where they may be combined with additional chemicals including varying amounts of polymer, gypsum and ammonia as appropriate to further promote the separation of solids and liquids in settling tank 23 which receives the output of mixer 22. The liquid output of settling tank 23 is delivered by pump 28 through pipe 29 to an irrigation system or to an irrigation storage facility (not shown) with an option for returning a small amount of liquid to tank 18 and pump 19 for any required dilution of effluent from the holding and mixing tank 18. The solids output of tank 23 is delivered to press 21, as shown in FIG. 4, where it is further de-watered along with the fiber output of screen 20. Press 21 returns its liquid output through conduit 31 to mixer 22 while its solid or fibrous output is carried by elevator 32 to the top entrance of a temperature-controlled tower (not shown) of a thermophilic or to the top fermenter shown, for example, as pile 33.

The solids deposited on the top of pile 33 move slowly from the top to the bottom of the pile as such solids are continuously added at the top and removed at the bottom through an exit 34 diagrammatically shown in FIG. 4. During the course of their travel from top to bottom of a fermenter tower or pile 33, the solid wastes 35 are broken down into protein and other valuable minerals through the fermenting action of thermophilic bacteria which thrive at the controlled elevated temperatures held inside the pile. The maintenance of the controlled elevated temperature in the range of 130 to 180 degrees Fahrenheit also destroys by pasteurization or partial sterilization all harmful bacteria which are detrimental to the health of livestock or humans.

The product of the fermenter tower or pile 33 is thoroughly dried by aeration in dropping on pile 33 or may be directed as shown in FIG. 4 to a dehydrator or dryer 36 from whence the product from the pile or dryer may be carried to storage bins (not shown) where they are directed into mixer 37. At this point, they may be combined with appropriate quantities of other feed supplements, if so desired, including such ingredients as grain, pulp, tallow, molasses, etc.

The output 38 of mixer 37 is measured by scales 39 and deposited in mixer 40, where it may be combined as desired with hay and/or other ingredients or with additional supplements 37' and deposited on a truck or delivered directly as a balanced ration to cattle enclosure 10 or to feeding stations for swine or other livestock. A silo 44 is also provided to serve as storage of the excess output of mixer 40.

It should be recognized, as shown in FIG. 4, that the solid or fibrous output from press 21 may be transferred directly to a silo 44A in the same dry or wet stage where it may be stored in a sealed, controlled atmosphere for later use. After storage in a limited or controlled atmosphere, it may be transmitted directly to the scales and feedlot, as shown, or it may be mixed with grain, pulp, tallow, molasses, etc. as desired and then transmitted to the scales and feedlot for refeeding purposes.

Another advantage of the method disclosed is that this method and apparatus are as effective on the processing of paunch wastes of the livestock as their excreted wastes.

The salient advantages of the improved waste processing system herein described are the following:

1. The aerobic treatment afforded by the transporting cross pit drain and canal branch 15 and 16, respectively, effectively control odor and reduce the biological oxygen demand (B.O.D.) of dissolved wastes, which reduction of B.O.D. serves the dual purpose of salvaging protein from the dissolved wastes and facilitating the treatment of the suspended solids. Treatment of solids is ordinarily impeded by the presence of high B.O.D. liquids and the reduction in B.O.D. of such liquids thus obviates the excessively thorough removal of such liquids prior to treatment of the solids.

2. Incorporation of the settling tank 23 through which liquids are passed first from screen 20 and again from press 21 provides for the thorough removal and salvage of the rich suspended solids present in such liquids and the collection of the resulting liquid which is very rich in organic and inorganic nutrients such as protein, starches, sugars, fats, carbohydrates, phosphates, sulphurs, potassium, etc. for separation therefrom or for prior to irrigation use of the liquid as is. With proper control of these separation processes, the discharged liquids may be returned also if so desired to the holding and mixing tank 18, thereby reducing the total amount of water required to support the cleaning and transporting operations.

3. The press 21 provides a supplementary liquid removal function beyond the capability of screen 20 and settling tank 23. The relatively thorough separation process in cooperation with the reduced level of B.O.D. for the residual liquids promotes the rapid and efficient ensuing treatment of the solids in the tower or pile 33.

4. The continuous movement of solids through tower or pile 33 as they are being treated is accomplished by gravity alone without the aid of expensive mechanisms or equipment.

5. The palatability, nutritive value, and hygienic quality of the feed supplement produced and the efficiency and speed of the treatment process is very significantly enhanced by the closely controlled temperature within tower or pile 33.

6. The total waste processing system including the cleaning, transporting, separation, treatment and storage operations are amenable to a high degree of automation through the use of relatively simple equipment requiring a minimum of maintenance and supervision.

7. Use of the slatted floor enclosure prevents the introduction of sand, soil, stones and other debris which would otherwise have to be removed or allowed to reduce the quality of the processed output.

8. The thorough removal of solids from liquids before discharging to an irrigation system promotes trouble-free irrigation through the elimination of sediment and clogging of pumping and other delivery equipment.

9. The processing of animal waste within a few hours after its generation results in a liquid product retaining a maximum amount of its valuable organic and inorganic nutrients.

10. The processing of the liquid portion of animal waste at the time it still contains its maximum amount of valuable organic and inorganic nutrients makes possible the salvaging of said nutrients in quantities heretofore impossible to obtain by prior art methods.

While the principles of the invention have now been made clear in an illustrative embodiment, there will be immediately obvious to those skilled in the art many modifications of structure, arrangement, proportions, elements, materials and parts used in the practice of the invention, and otherwise, which are particularly adapted for specific environments without departing from these principles. The appended claims are therefore intended to cover and embrace any such modifications within the limits only of the true spirit and scope of the invention.

What is claimed is:

1. Apparatus for collecting the processing animal waste comprising:
   a pen for containing livestock having a slotted floor,
   a trough arranged below said floor for receiving animal waste dropped therein by the animals housed in said pen,
   scraper means for periodically removing the animal waste from said trough to a holding tank in time periods of less than 24 hours,
   a holding tank for diluting the waste,
   separating means for removing the solids from the liquids of the diluted waste received from said holding tank,
   press means for receiving and compressing the solids from said separating means,
   drying means for receiving the solids from said press means for moisture reduction and pasteurization thereof, and
   means for processing the liquids received from said separating means.

2. The apparatus set forth in claim 1 wherein:
said drying means comprises a thermophilic pile.

3. The apparatus set forth in claim 1 wherein:
said drying means comprises a fermenter.

4. The apparatus set forth in claim 1 wherein:
said drying means sterilizes the solids from said press means.

5. The apparatus set forth in claim 1 in further combination with:
   means for receiving at least a part of the liquid pressed from said solids by said press means for transmittal back to said holding tank.

* * * * *